(12) United States Patent
Grothues

(10) Patent No.: US 7,419,076 B1
(45) Date of Patent: Sep. 2, 2008

(54) FLOAT TUBE CARRIER

(76) Inventor: Ulrich Grothues, 360 S.Lilac Ct., Anaheim Hills, CA (US) 92808

( * ) Notice: Subject to any disclaimer, the term of this patent is extended or adjusted under 35 U.S.C. 154(b) by 0 days.

(21) Appl. No.: 11/435,027

(22) Filed: May 16, 2006

(51) Int. Cl.
    *B60R 5/11* (2006.01)
(52) U.S. Cl. .................. 224/519; 114/343; 224/502; 224/533
(58) Field of Classification Search ............ 114/343; 224/400, 488, 495, 502, 503, 511, 519, 533
    See application file for complete search history.

(56) References Cited

U.S. PATENT DOCUMENTS

| | | | |
|---|---|---|---|
| 4,128,195 A | 12/1978 | Collins | |
| 4,318,501 A | 3/1982 | Graber | |
| 5,190,195 A * | 3/1993 | Fullhart et al. ............ | 224/497 |
| 5,330,084 A | 7/1994 | Peters | |
| 5,373,978 A | 12/1994 | Buttchen et al. | |
| 5,443,189 A | 8/1995 | Hirschfeld | |
| 5,476,202 A | 12/1995 | Lipp | |
| 5,775,555 A * | 7/1998 | Bloemer et al. ............ | 224/531 |
| 6,062,451 A * | 5/2000 | Lassanske et al. ......... | 224/502 |
| 6,164,508 A * | 12/2000 | van Veenen ................ | 224/509 |
| 6,460,745 B1 | 10/2002 | Weaver | |
| 6,612,615 B1 | 9/2003 | Dimand | |
| 6,988,645 B1 | 1/2006 | Nusbaum et al. | |

* cited by examiner

*Primary Examiner*—Sherman Basinger
(74) *Attorney, Agent, or Firm*—Player Law Offices

(57) ABSTRACT

The present invention comprises a float tube carrier comprised of a support member and one or more pairs of arms extending from said support member and capable of securing one or more float tubes. Alternatively, the support member comprises a mount arm capable of securing to a vehicle, and a rotatable and removable support member connecting to said mount arm through a locking swivel. The support member may also comprise a generally 1-shaped mount arm capable of securing to a hitch, and having a locking swivel for removably connecting to the mount arm or, a generally I-shaped support member with a locking swivel for removably connecting to the mount arm. The carrier further comprises a first and second pair of arm members with a locking pivot operatively engaging a support member and, a first and second locking bar for securing one or more float tubes.

5 Claims, 6 Drawing Sheets

DETAIL A

DETAIL A

DETAIL G

DETAIL H

FLOAT TUBE CARRIER

BACKGROUND OF THE INVENTION

1. Field of the Invention

The present invention relates to vehicle mounted article carriers. More particularly, the present invention relates to a carrier for aquatic recreational equipment such as float tubes.

2. Description of Related Prior Art

There is currently no vehicle rack on the market that is specifically designed for transporting float tubes. Although there are a host of various rack designs for bikes, skis, surfboards, and other articles, none of them are sufficiently designed for transporting inflated float tubes.

Float tubes—also called Belly Boats—are large, glorified innertubes with a saddle (two leg holes at the bottom of the tube) primarily used for fishing but also for waterfowl hunting and other aquatic activities. A person sits in a float tube in the water and fishes, hunts, and etc. Float tubes come in two standard shapes: round, (donut style) or U-shaped. What is common on all float tubes is the placement and size of the holes of the saddle where any difference in dimension or size is nominal.

Although float tubes can be inflated and deflated fairly easily, this becomes an inconvenience when a person needs to make periodic trips to separate fishing or hunting locations. The reason being, it is highly inconvenient to deflate a float tube and then re-inflate it shortly thereafter upon reaching a water destination only a short distance away. This is especially true when the float tubes become wet, dirty, or caked with mud and other debris. Even placing them in the bed of a pickup truck—not to mention the inside of a vehicle cab—consumes space and can soil and create water damage to articles in the cab or pickup bed.

What is needed is a portable, easy-to-use, convenient carrier that can attach to a vehicle for transporting inflated float tubes.

SUMMARY OF THE INVENTION

Accordingly, one object of the present invention is to provide an apparatus capable of securing a carrier to a vehicle for transporting float tubes.

It is therefore a second object of the present invention to provide a float tube carrier capable of mounting to any of several known hitch extenders, tow ball hitch, or bumpers.

It is therefore a third object of the present invention to provide a float tube carrier that can support and carry one or more float tubes through the use of an extending and retracting arm assembly.

It is therefore a third object of the present invention to provide a float tube carrier that is removable from a hitch mount.

It is therefore a third object of the present invention to provide a float tube carrier that can swivel and lock into a desired position around a mount arm.

It is therefore a third object of the present invention to provide a retractable arm assembly with a locking mechanism for securing float tubes.

DETAILED DESCRIPTION OF THE DRAWINGS AND PREFERRED EMBODIMENTS

Figure 1:
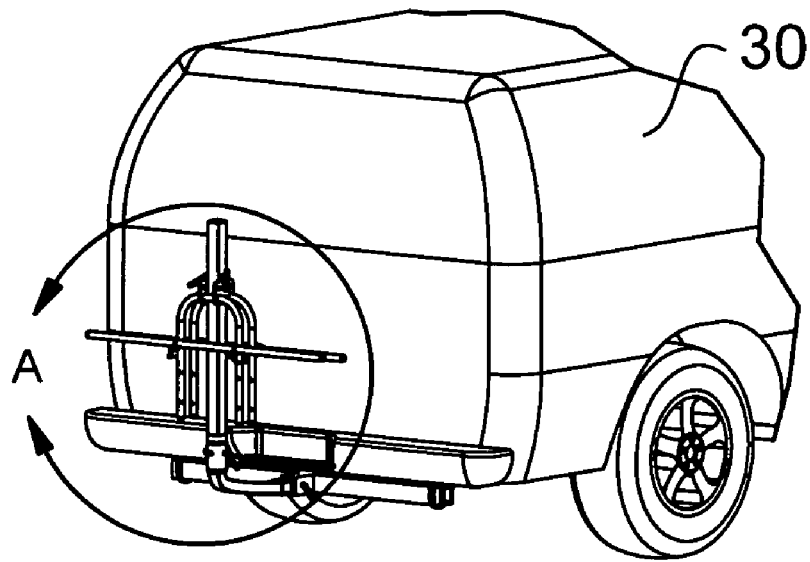
FIG. 1 is a rear perspective view of a hitch mounted float tube carrier with arms in a retracted position and having detail A.

A complete understanding of this invention can be gained through reference to the drawings in conjunction with a thorough review of the disclosure herein. To facilitate this understanding, a table of commonly used reference numerals is provided.

| | |
|---|---|
| 1 | float tube carrier |
| 2 | mount arm |
| 3 | mast |
| 4 | arm |
| 5 | locking bar |
| 6 | hitch |
| 7 | mast tube |
| 8 | mount arm tube |
| 9 | mast collar |
| 10 | upper bracket aperture |
| 11 | lower bracket aperture |
| 12 | first bracket |
| 13 | second bracket |
| 14 | pivot bolt |
| 15 | arm locking bolt |
| 17 | mount arm lumen |
| 19 | locking bar bolt |
| 20 | locking bar pin |
| 21 | pin |
| 22 | mast mount |
| 25 | float tube |
| 30 | vehicle |

Figure 2:
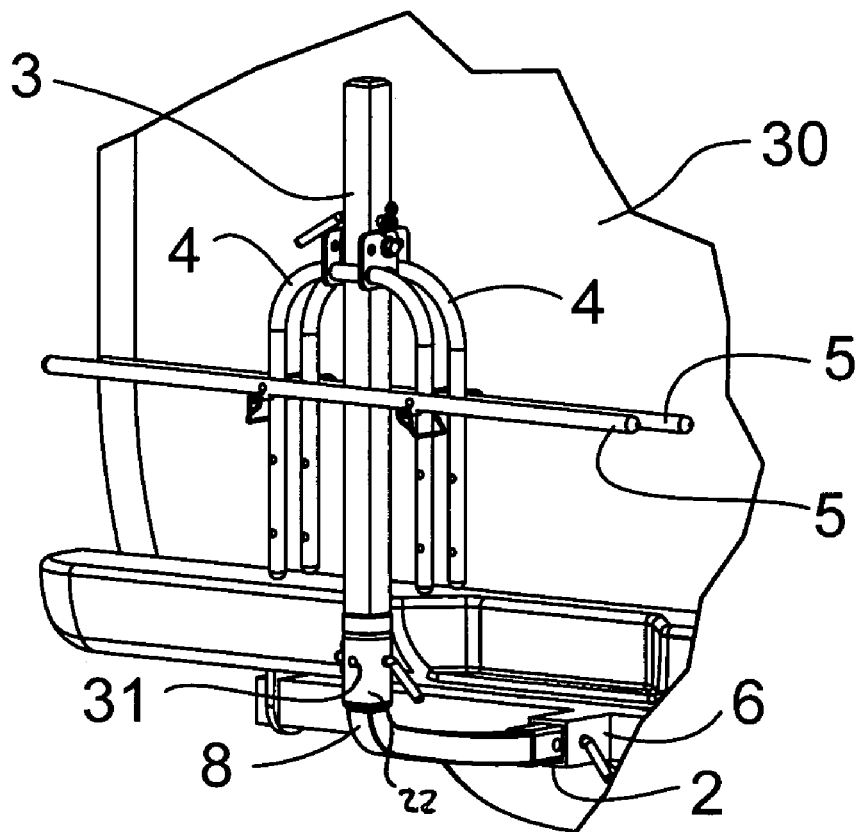
FIG. 2 is a rear perspective view of a hitch mounted float tube carrier with two pairs of arms in a retracted position.
Figure 3:
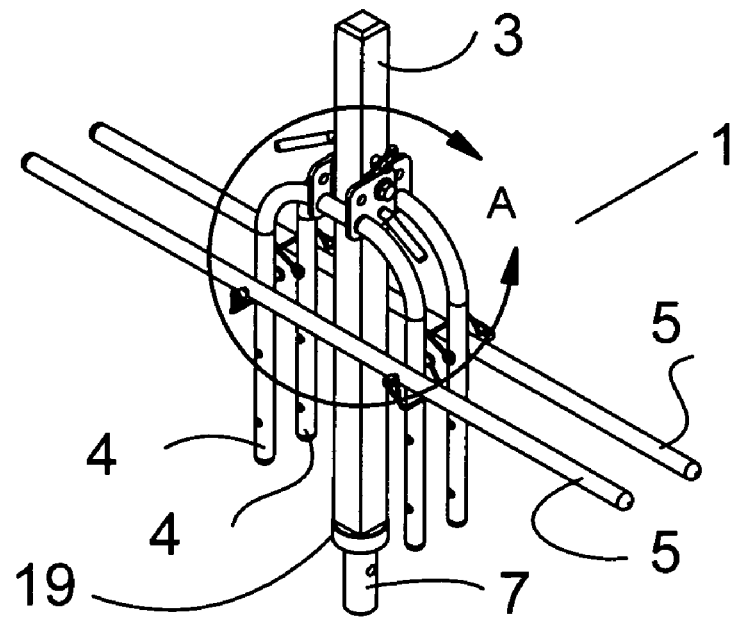
FIG. 3 is a perspective view of a hitch mounted float tube carrier with arms in a retracted position and with the mast separated from the hitch and having Detail A.
Figure 4:
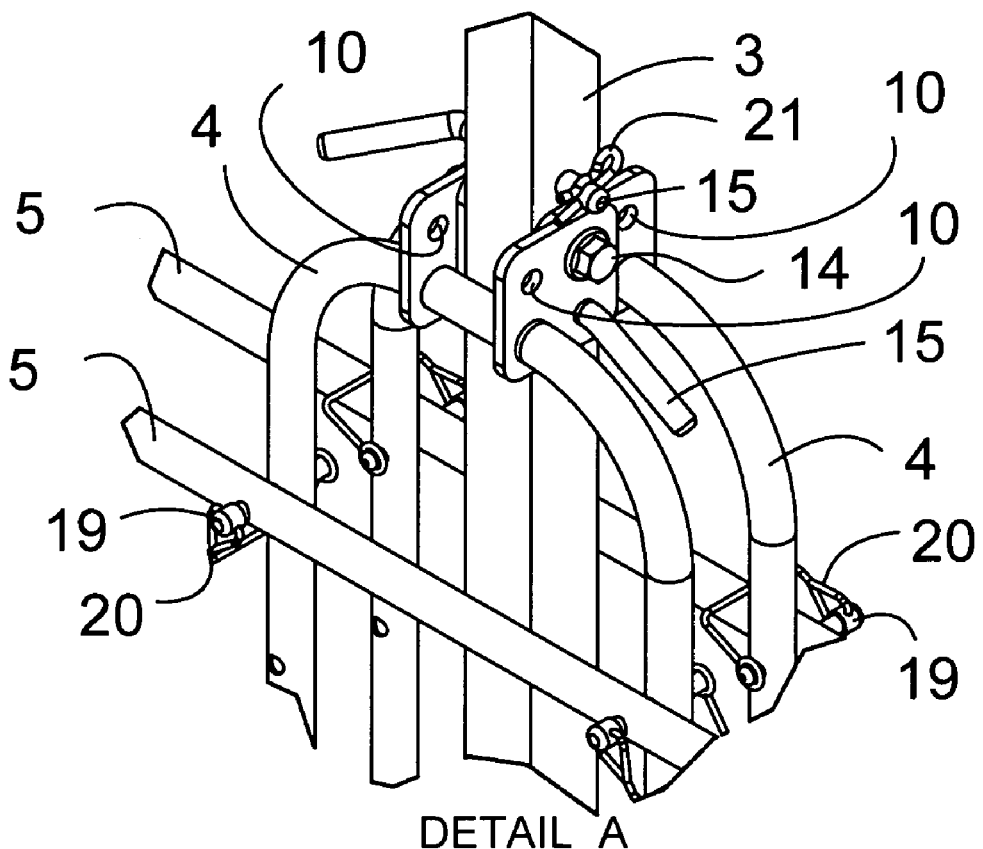
FIG. 4 is Detail A of FIG. 3 showing the bracket positions of a bracket assembly when both pairs of arms are in a retracted position.
Figure 5:
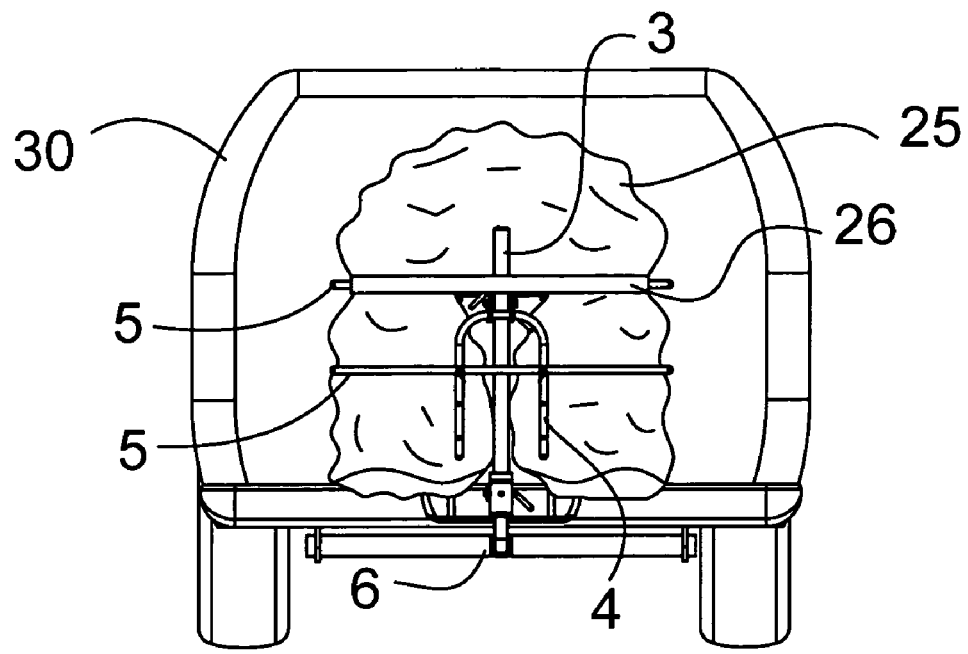
FIG. 5 is a rear view of a float tube carrier with one pair of arms extended and holding one float tube.
Figure 6:
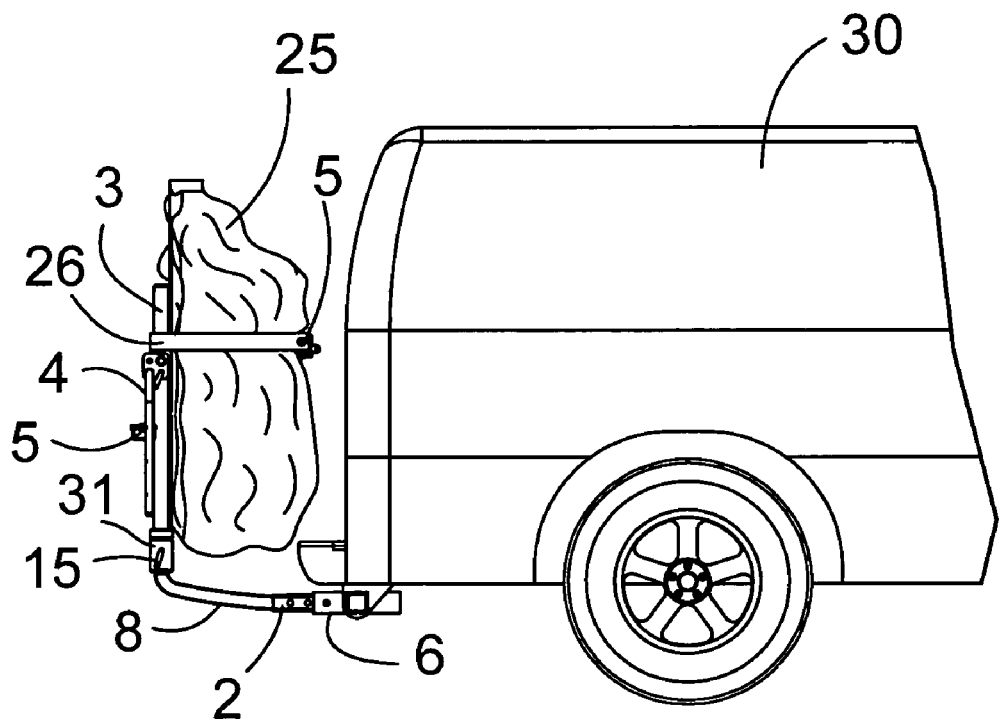
FIG. 6 is a side view of a float tube carrier with one pair of arms extended and holding one float tube.
Figure 7:
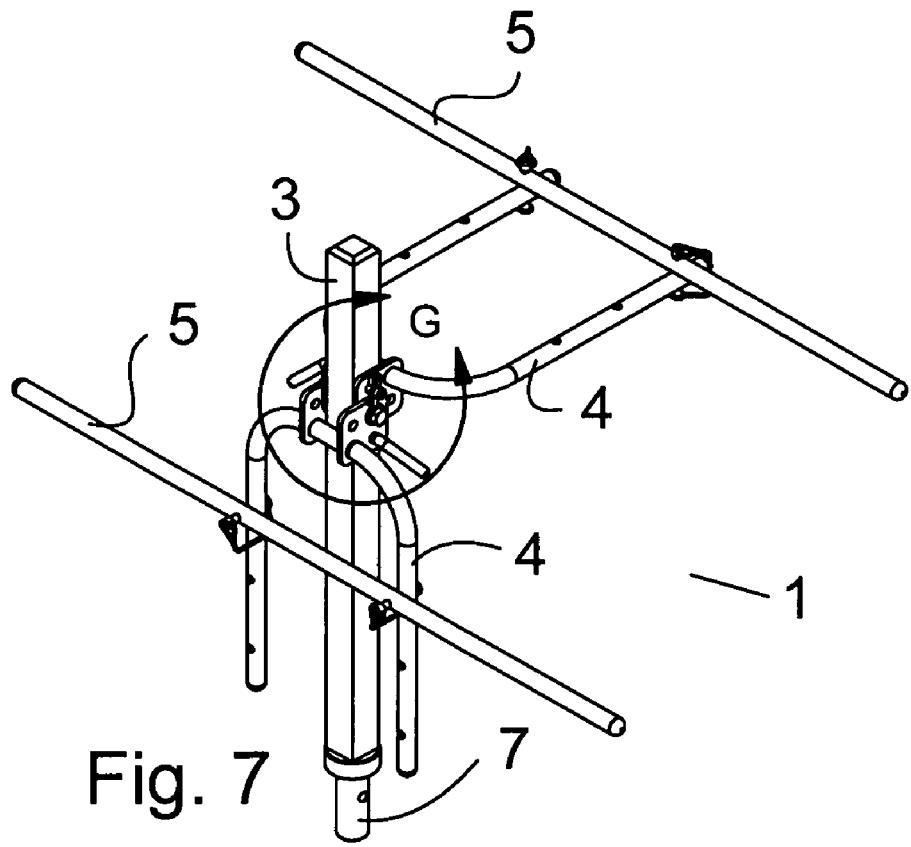
FIG. 7 is an elevated perspective view of a float tube carrier with a first pair of arms in an extended position and having Detail G.
Figure 8:
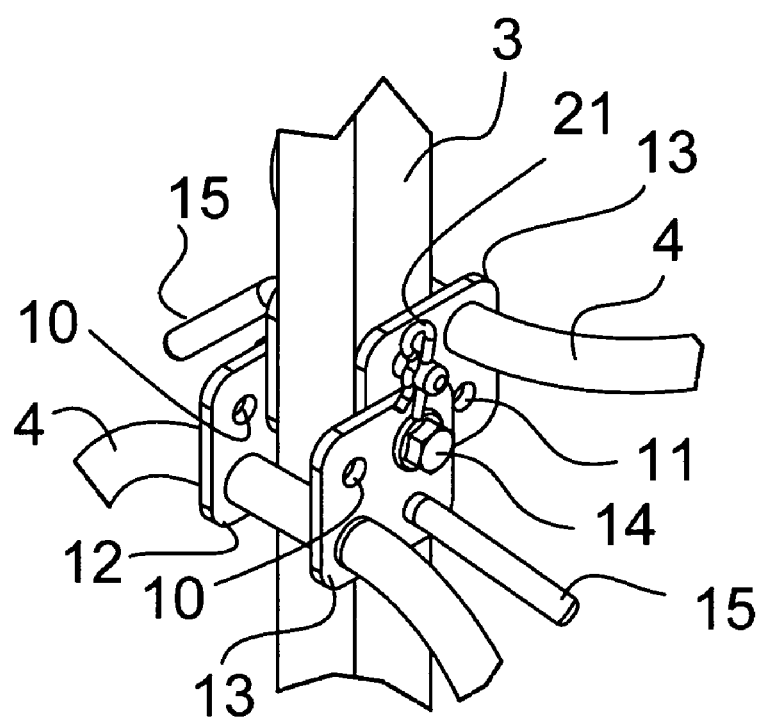
FIG. 8 is Detail G of FIG. 7 showing the bracket positions of a bracket assembly when one pair of arms is in a retracted position and a second pair is in an extended position.
Figure 9:
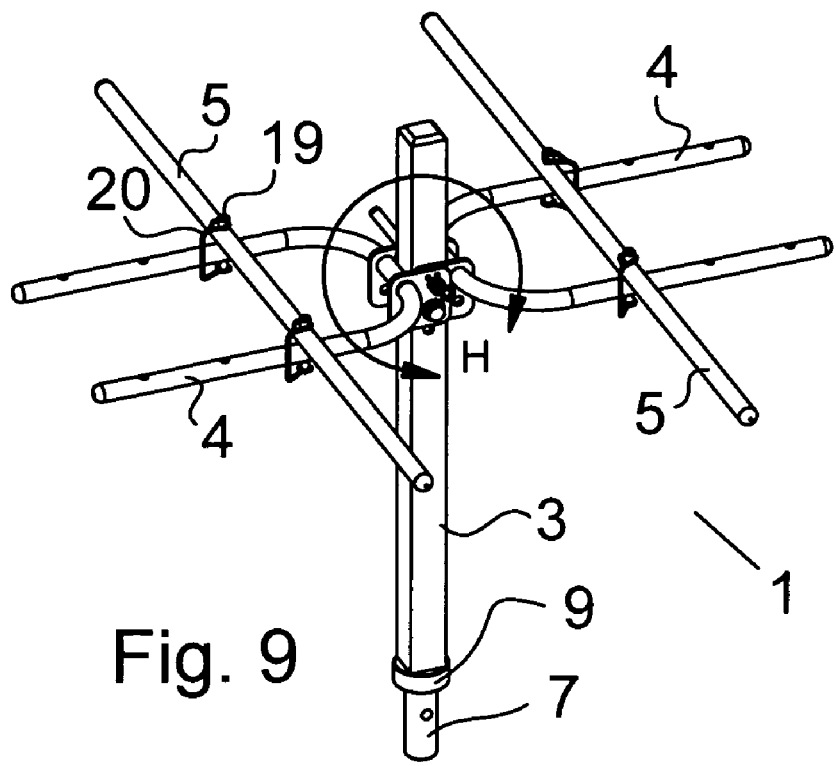
FIG. 9 is a perspective view of a float tube carrier where both pairs of arms are in an extended position and having Detail H.
Figure 10:
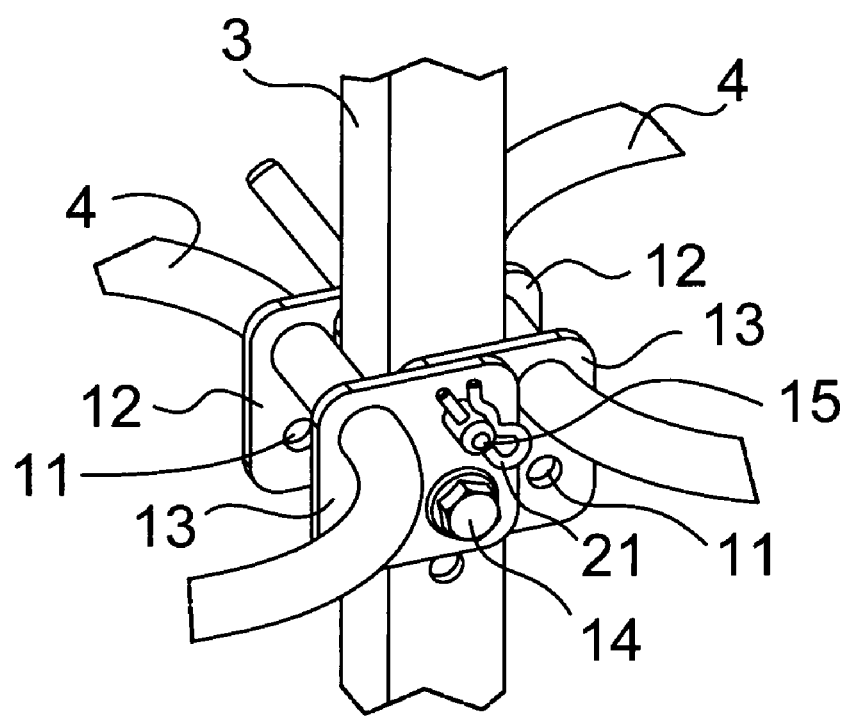
FIG. 10 is Detail H of FIG. 9 showing the bracket positions of a bracket assembly when both pairs of arms in an extended position.
Figure 11:
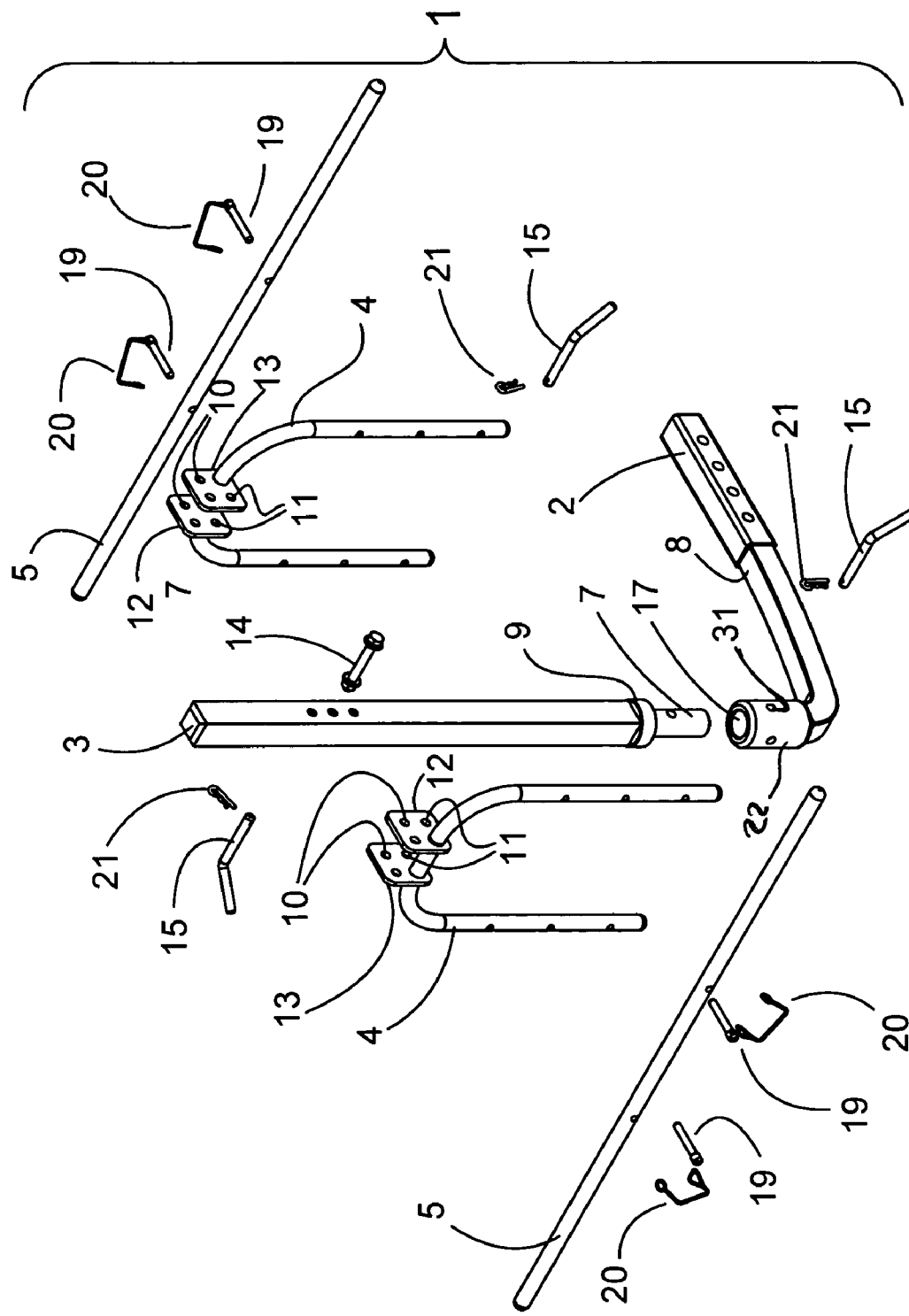
FIG. 11 is an exploded view of s float tube carrier with two pairs of retractable arms, having a hitch mount, and a detachable swiveling mast.

FIGS. 1 and 2 illustrate a preferred embodiment of a float tube carrier 1. As shown, a carrier 1 is adaptable for securing to a standard hitch 6 mounted on a vehicle. Extending outward from the rear of the vehicle is an 1-shaped mount arm 2 that bends vertically and can be joined to a mast 3. On the mast 3 are two pairs of brackets 12 13 (FIG. 10) engaging one or more arms 4 that are pivotally attached to the mast 3 thus, allowing them to extend or retract upward (FIG. 9) or retract into a collapsed position. (FIG. 3) When the arms 4 are extended upward, they can be inserted through the leg holes in the saddle of a float tube 25 as is shown in FIGS. 5 and 6. In the present embodiment shown in FIG. 1, each pair of arms 4 can accommodate two fully inflated float tubes 25 when each arm 4 is fully extended. To properly secure the float tubes while being transported, a locking bar 5 lies transverse across each pair of arms 4 and is secured to the arms in this embodiment through the use of pins 21.

To enable convenient transport of the present invention, known attachment mechanisms for attaching to a vehicle are used. In a preferred embodiment, a mount arm 2 capable of being inserted into a hitch extension 6 such as an extended trailer connection that has a connection point for connecting other racks may also be used interchangeably in accordance with the objects of the present invention. See, for example, U.S. Pat. No. 5,373,978 to Buttchen or U.S. Pat. No. 6,460,745 to Weaver.

In an exemplary embodiment, and one used and tested with a great success, a mount arm 2 is connected to a tow ball hitch mount (not shown) and secured to a ball hole with a bolt. However, other known methods for securing a tow ball through the use of a tow ball hitch are common in the art and can also be used with success in place of this embodiment. Alternatively, a tow ball hitch for securing bumper-mounted mechanisms may also be used. See, for example, U.S. Pat. Nos. 4,318,501 to Graber; 4,128,195 to Collins; and 4,050,616 to Mosow.

In a preferred design the mount arm 2 extends by way of a mount arm tube 8 that forms an 1-shape or other shape that will allow the carrier to extend generally vertical. FIG. 6 shows a tube 8 that has a slight degree of inclination to allow for ground clearance. In another exemplary and tested design the carrier has two bend points allowing for a vertical positioning of the carrier arms 4 and also allows for ground clearance. In this embodiment (not shown) a first bend point occurs approximately half way down the arm tube 8 to provide clearance in the event there are bumps in the road (e.g., driveway bibs etc.) and a second bend at the terminal end of the tube 8 occurs where the mount arm 2 connects to the mast 3. Alternatives to a multiple bend configuration can include varying one or more bend degrees totaling an aggregate degree amount of about 90 degrees. Alternatively, the inclination of the mast 3 can be created by a bend in a connector from a mast 3 to a mount arm 2 where the bend is in the mast 3 and creates a generally horizontal insert into the mount arm 2.

In another embodiment a 90 Degree connection from mast to mount arm is accomplished by a solid or hollow tube (either square, round, triangular or any other shape) attached to the terminal end of the mount arm 2 (either by weld, bracket bolt, or any other method of attachment) into which the mast 3 slides into it or over it.

Preferably, the mount arm 3 extends outward from a vehicle far enough to allow room for tailgates, hatches or trunks to be opened with the float tube carrier still attached to the vehicle, as well as to allow float tubes 25 to be transported on the arms 4 between the vehicle 30 and the carrier 1. In the embodiment shown in FIG. 6 enough room has been allowed to transport inflated float tubes on each pair of arms although it will be readily ascertained that a smaller or larger carrier could be made for decreasing or increasing the number of float tubes the carrier 1 can hold.

To enable transport of float tubes, a mast 3 is incorporated in to the present invention. A mast 3 extends generally vertical from the mount arm 2. In a preferred embodiment shown in FIG. 10, a mast 3 is secured to a mount arm 2 and tube 8 through a mast tube 7 that inserts into a mast mount 22 at the terminal end of the mount arm 2. In this way, the mast 3 can swivel around its axis on the mast mount 22. For a secure fit, a collar 9 can be secured to the inside of the mast mount 22 for turning ease and also to add weld strength. This allows the mast 3 to be inserted into the mast mount 22 so that it can rotate around its axis as well as provide a connection to the mount arm tube 8. To lock the mast 3 and prevent it from swiveling after it is rotated to a desired position, apertures 31 can be placed either in the mast mount 22 (FIG. 10) and in the mast tube 7 through which a locking bolt 15 can be inserted.

Alternatively, a sleeve could be welded into the mast mount 22 wherein the mast 3 can slide over the sleeve and then secured with a bolt in the same way as described where a tube 8 extends from the mast 3 as previously described.

In addition to a circular tube 8 disclosed and illustrated in the drawings, the shape of the tube 8 can be either square or channeled so that the mast 3 can be rotated by lifting it up and turning it to its desired orientation. In the same way the tube 7 can be an outer tune, either round, square or channeled, with the mast 3 sliding inside or outside of the tube 7. The sleeve 7 can be attached to the mast 3 or mast mount 22 by bolt, weld, pin, clamp, or any other hardware that will adjoin the pieces together, either permanently or removably.

The mast 3 provides a supporting structure to hold the arms 4 and provide a generally vertical position of the entire device 1. In a preferred design it extends vertically with three holes approximately 10" from the top where the arm brackets 12 13 attach to the mast 3. The length and positioning of the holes in the mast or length of the sleeve is not critical, and can be adjusted to meet specific design requirements.

In a preferred design, the entire assembly including the mast 3, mount arm 2, and mount tube 8 should be spaced enough distance away from the back of a vehicle to allow for arms 4 with float tubes to pivot or carry float tubes without coming in contact with the vehicle.

The arms 4 comprise two parallel bars that hold float tubes 25. A preferred attachment mechanism for securing the arms 4 to the mast 3 is through the use of two pairs of pivoting brackets or cams 12 13. In this embodiment the arms 4 are welded to each pair of brackets as is shown in detail in FIGS. 2, 4, 8, and 10.

The current design comprises two pairs of rectangular brackets 12 13 with four apertures drilled through it. There are two brackets for each pair of arms 4. The largest aperture on the top outside portion holds the each arm 4 in place via a weld; a pivot bolt 14 is placed through an aperture caddy corner to the weld; two more apertures, an upper aperture 10 and lower aperture 11, are also placed on each bracket 12 13. The upper aperture 10 is used to position the arms 4 in an extended position whereby a locking bolt 15 is inserted through it and a pin 21 is used to secure it in place. Conversely, the lower aperture 11 is used to position the arms 4 in a retracted position whereby a locking bolt 15 is inserted through it and a pin 21 is used to secure it in place.

The brackets 12 13 are spaced approximately 2.25" apart from each other. This is to allow each pair of arms 4 to be attached into identical apertures on the opposite side of each pair of arms 4 without each pair of brackets interfering with the other. The brackets 12 13 are staggered so that a universal piece can be made. However, an alternative option would be to have brackets on one pair of arms spaced greater than the other so that it can fit around the bracket of the opposing pair of arms.

The actual arm assembly in the current design uses a single piece of tubing bent into a U-Shape to form one arm 4. Apertures are then drilled through the each arm 4 at prescribed intervals so that a locking bar 5 can be connected to each arm 4. The locking bar 5 also has apertures drilled where a locking bolt 19 and pin 20 can be inserted through the locking bar 5 and the arm 4. The length of the locking bar 5 is not critical but was designed to be as long as the diameters of most large float tubes. There are several other options which were considered that can also be used to design the arm assemblies, which are discussed below.

The dimensions or shape of the brackets 12 13 are not critical. Initial designs had them in a round shape, D-Shape, oblong shape, triangular shape etc., and the hole spacing was in several other locations as well. Furthermore, a bracket is not the only option as other options considered and tried are acceptable for use.

A bracket or hinge can be used allowing arms to swing from side to side (vice vertically) and are then pinned or bolted in place; arm or arms can be connected to a sleeve of larger diameter than the mast 3, which can then also be bolted or pinned in place. This would allow the arms 4 to either be rotated around a mast 3, or, if square tubing is used, it could be inserted over the mast 3 and slid into its desired position and secured by the desired hardware. Instead of folding down, arms 4 could then be slid off the mast 3; apertures could be drilled through the mast 3 whereby the arms 4 could slide through the aperture and secured with the desired hardware; the arms can be broken up into three segments: one attached to the mast 3 and the other two either inserted into a bar attached to the mast 3 or attached via collar or clamp so that it could be adjustable; a single arm could be used instead of pair of arms—although use of a single arm proved too much movement of tubes during transport; finally, the whole arm assembly could be welded to the mast 3.

Once the float tubes 25 are inserted over the arms 4 of the float tube carrier 1, a locking bar 5 is fastened to each arm 4 where it intersects them. In a preferred embodiment, the locking bar 5 is straight and extends over each arm to provide more support for a float tube 25. However, there are many shapes or forms the locking bar 5 can take that will prove sufficient for purposes of the objects of the present invention such as molded loops which can be inserted over the arms 4; a pin attachment to apertures in the arms; clamps can be fastened to the locking bar 5; or, in FIGS. 5 and 6 an elastic or material adjustable strap 26 can be used to cinch the float tubes 25 secure to a mast 3. Other known means for fastening techniques can be also be used and will be recognizable by those skilled in the art.

The arms 4 are spaced sufficiently apart to extend through the saddle holes of each float tube. The distance of each saddle hole are all approximately the same distance apart for every float tube regardless of the overall size since each tube needs to accommodate a person.

In addition to the current design, one could also add stabilizer bars (bars perpendicular to the mast 3 that the tubes 25 could lay against) across the back of the rack, however, these were not considered critical but an added feature to the present invention.

Further, a similar design in which the mount arm 2 and mount tube 8 is eliminated and the mast 3 has a bend in it to clear the mast 3 from a bumper or vehicle so that float tubes could only ride facing away from the vehicle. A longer arm assembly would then be used to hold more than two tubes. Additionally, a stabilizer bar or strap could then attached to the bottom of the tubes.

Connection points for the arm assembly could be molded or cast items such as cams, collars, or T-joints, to name a few, that would connect the parallel bars of the arm assembly to the back bar of the arm assembly. In addition, the locking bar 5 could also be connected to the arm assembly in the same method, which would actually make the arm assembly and locking bar 5 more adjustable and most likely reduce long term costs.

The current design uses square steel tubing for the mount arm, mast, and arms however, round tubing, channel iron and angle iron or any other rigid metal plastic or other composite could be used. Square steel tubing was chosen primarily for strength, aesthetics, manufacturability and cost.

CONCLUSION, RAMIFICATIONS, AND SCOPE

While the above description contains various preferred, exemplary, and other specific embodiments, these should not be construed as limitations on the scope of the invention, but as exemplifications of the presently preferred embodiments thereof. Many other ramifications and variations are possible within the teaching of the invention.

Thus the scope of the invention should be determined by the appended claims and their legal equivalents, and not solely by the examples given.

I claim:

1. A float tube carrier comprising:
   a support member comprising a first end and a second end;
   said first end having means for attaching said support member to a vehicle;
   one or more arms capable of securing one or more float tubes by extending from said support member proximal to said second end and through one or more apertures on said one or more float tubes;
   said second end of said support member extends above said one or more arms a distance sufficient to prevent a float tube from slipping over said support member;
   one or more locking bars that extend across said one or more float tubes placed over said one or more arms to secure them onto said float tube carrier; and
   said locking bars further comprise one or more alignable apertures on said locking bars and on said arms whereby one or more locking members can be inserted through said alignable apertures for locking said locking bars onto said arms.

2. The float tube carrier of claim 1 wherein said support member further comprises a removable and rotatable locking swivel comprising a mount tube capable of being inserted into a support member mount and, having one or more apertures on said support member mount and said mount tube capable of being aligned whereby a locking member can be inserted through the aligned apertures.

3. The float tube carrier of claim 1 wherein said one or more arms extending from said support member are detachable.

4. The float tube carrier of claim 1 wherein:
   said support member pivotally engages one or more pair of arms through a pair of brackets for each pair of arms wherein each bracket is pivotally secured to said support member by a member bolt or pin; and
   each pair of brackets and said support member incorporate apertures capable of being aligned for insertion of one or more locking bolts or pins to fix said arms in either an extended or retracted position.

5. A float tube carrier comprising:
   a support member comprising a first end and a second end;
   said first end having means for attaching said support member to a vehicle;

one or more arms capable of securing one or more float tubes by extending from said support member proximal to said second end and through one or more apertures on said one or more float tubes;

said second end of said support member extends above said one or more arms;

one or more locking bars transverse to and selectively adjustable to a desired position on, said one or more arms and secured to said one or more arms at said desired position through one or more removable locking members;

said support member pivotally engages one or more arms through a bracket for each one or more arms wherein each bracket is pivotally secured to said support member by a bolt or pin; and each bracket and said support member incorporate apertures capable of being aligned for insertion of one or more locking bolts or pins to fix said one or more arms in either an extended or retracted position.

\* \* \* \* \*